May 27, 1924.
F. D. HOWE
1,495,744
BEARING SUPPORT FOR DRIVE SHAFTS
Filed Nov. 1, 1920
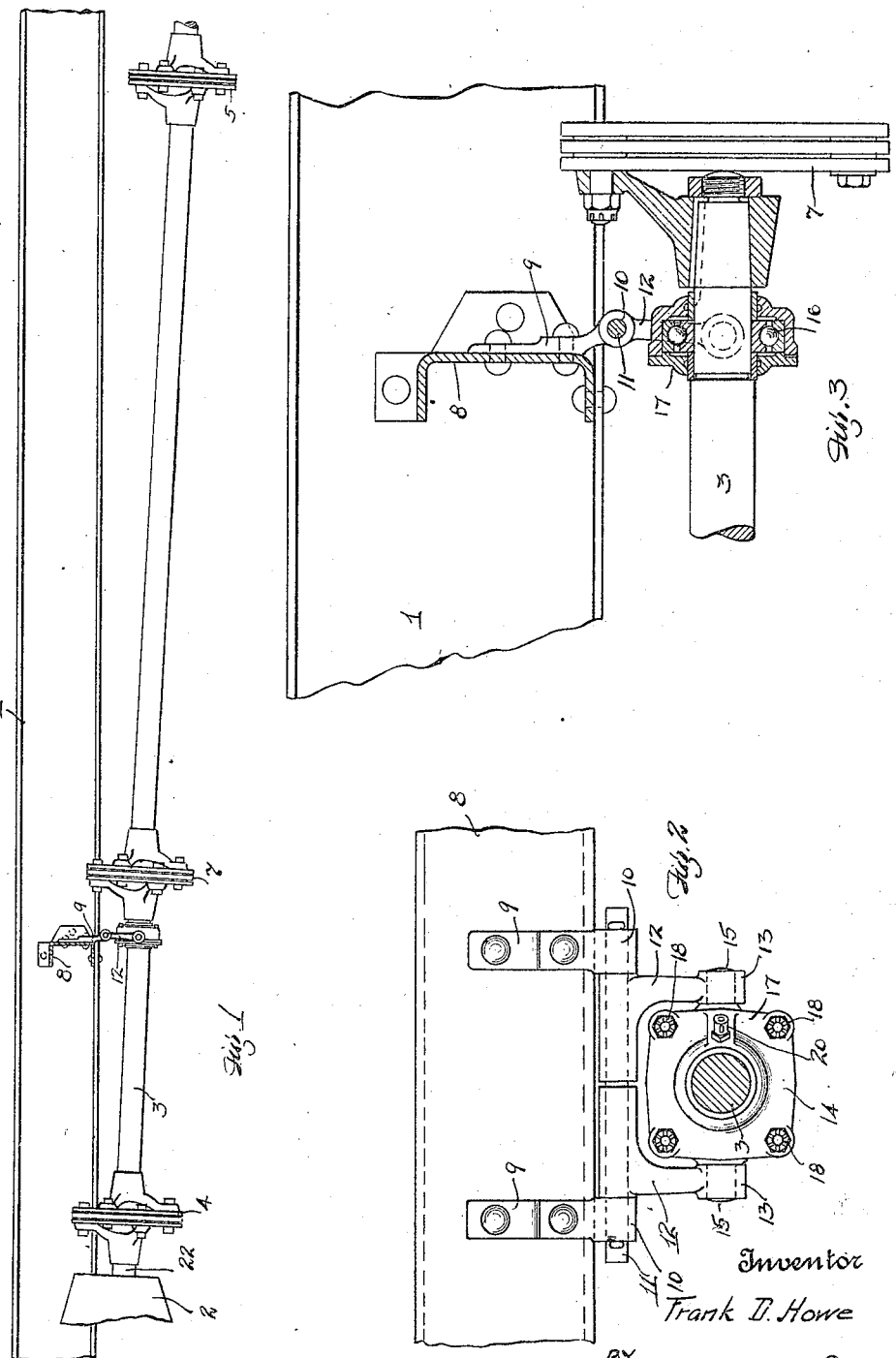
Inventor
Frank D. Howe
By Fay, Oberlin & Fay
Attorneys Patented May 27, 1924.

1,495,744

UNITED STATES PATENT OFFICE.

FRANK D. HOWE, OF KENT, OHIO.

BEARING SUPPORT FOR DRIVE SHAFTS.

Application filed November 1, 1920. Serial No. 420,932.

*To all whom it may concern:*

Be it known that I, FRANK D. HOWE, a citizen of the United States, and a resident of Kent, county of Portage, and State of Ohio, have invented a new and useful Improvement in Bearing Supports for Drive Shafts, of which the following is a specification, the principle of the invention being herein explained and the best mode in which I have contemplated applying that principle, so as to distinguish it from other inventions.

The present invention relates to means for supporting the driving shaft of a motor vehicle, and more particularly relates to a bearing for supporting the central portion of such a shaft so as to allow three universal joints to be used where this is necessary on long shafts such as are commonly used in auto trucks and delivery wagons. This central bearing is so made as to be self aligning; and means are employed whereby the bearing may have a limited amount of movement both to compensate for angular positions of the shaft as well as for the longitudinal movement of the shaft due to the spring action of the vehicle. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is an elevational view of the drive shaft of a vehicle showing the arrangement of the universals and the central bearing; Fig. 2 is a rear elevation of the bearing but showing the drive shaft in sections; and Fig. 3 is a sectional view through the bearing and the central universal joint.

In Fig. 1, the automobile or car frame 1 is shown which carries the usual gear box 2 with its driven shaft 22 to which is attached the drive or propeller shaft 3 by means of a forward universal joint 4. This propeller shaft 3 also has a rear universal joint 5 to which it is coupled, this joint being normally placed just in front of the differential housing and being attached to the shaft in the housing which carries the usual drive pinion.

In large trucks or delivery wagons, a long body space is usually needed to give the required carrying capacity and for this reason the propeller shaft is usually so long that whipping occurs at high speeds and this whipping is particularly noticeable when the car coasts at high speed down hills and the like. To overcome this whipping action, it is necessary to make the shaft unnecessarily large and stiff for the power to be transmitted, or it is necessary to have a centrally placed universal joint 7 together with some means for supporting the shaft in front of this central universal.

Where such a central bearing is employed, it is either necessary to make this bearing substantial enough to take the end thrust due to the movement of the shaft caused by the spring action, or it is necessary to use a bearing which will have sufficient play to compensate for the movement of the shaft.

In the present construction, the frame member 1 is provided with a cross member 8 which is securely riveted thereto, the member having brackets 9 extending below the bottom section of the frame and being there provided with suitable apertures 10 adapted to receive a bolt or short shaft 11 therein. Mounted on this shaft are two links 12 which surround the shaft between the brackets for almost the entire length of the shaft or bolt, and these links extend downwardly and have suitable apertured ends 13. The bearing proper is formed of a suitable case 14 having trunnions 15 which fit in the apertures in the ends 13 of the links. This case provides a hollowed out member adapted to receive a ball bearing 16 which carries the shaft, the case having a cover 17 provided with bolts 18 or other securing means so as to form a dust proof lubricant retaining case for the bearing.

The trunnions 15 allow the entire case and bearing to pivot as much as may be necessary to compensate for the angular movement of the shaft and the longitudinal movement of the shaft which is due to the spring action and which is particularly noticeable where the "Hotchkiss" type of drive employed, is compensated for by the pivotally mounted links 12 which pivot around the shaft or bolt carried by the brackets. This pivotal movement of these links allows the entire casing to have a limited amount of movement longitudinal of the frame so that this center bearing is merely a support and does not have to take up end thrust. The links have long bearings on the supporting pin giving them considerable sidewise rigidity, so that any rotational vibration of the shaft due to lack of balance or to whipping, is properly backed up. Two independent links are used so that the bearing is self aligning in all directions.

In this way the end thrusts may be taken up at the forward end of the shaft where it is attached to the transmission or gear case and where suitable provision for this end thrust may readily be made. When fabric or disc joints are used the longitudinal movement of the shaft is absorbed by three joints instead of two, reducing the distortion of the discs by one third. This central bearing is substantially dust proof and lubricant tight, and merely acts as a support for the shaft and the central universal joint, so that the shaft between universals may be kept at such a length, that whipping can be eliminated without the necessity of using a shaft larger than is necessary for transmitting the desired amount of power. As shown, the bearing case is provided with a lubricant opening 20 so that oil or grease may be readily forced into the bearing. This central bearing will normally be placed at the point where there is a cross member in the frame so that the brackets can be attached to the cross member, thus stiffening the frame at this point.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:—

1. In a sectional driving shaft the combination of flexible disk joints at each end of each shaft section, and a movable supporting bearing for one section adapted to allow longitudinal shaft movement to divide the distortion among the several flexible joints.

2. In a drive shaft, the combination of two shaft sections connected by a flexible disk joint and two flexible disk joints at the other section ends, and a self aligning, movable bearing for one section adapted to allow longitudinal movement and change in angularity of said shaft, and adapted to divide the distortion between the several flexible disk joints to reduce the individual distortion in each disk joint.

Signed by me, this 27th day of October, 1920.

FRANK D. HOWE.